(12) United States Patent
Hall et al.

(10) Patent No.: US 8,656,473 B2
(45) Date of Patent: Feb. 18, 2014

(54) LINKING WEB IDENTITY AND ACCESS TO DEVICES

(75) Inventors: Martin Hall, Sammamish, WA (US); Ali Khan, Duvall, WA (US); Mark McNulty, Renton, WA (US); Zhangwei Xu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 912 days.

(21) Appl. No.: 12/466,103

(22) Filed: May 14, 2009

(65) Prior Publication Data

US 2010/0293607 A1 Nov. 18, 2010

(51) Int. Cl.
*G06F 7/04* (2006.01)

(52) U.S. Cl.
USPC .............................................. 726/9

(58) Field of Classification Search
USPC .............................................. 726/9
See application file for complete search history.

(56) References Cited

U.S. PATENT DOCUMENTS

| | | | | |
|---|---|---|---|---|
| 6,708,086 B2* | 3/2004 | Richard | | 701/1 |
| 7,103,575 B1* | 9/2006 | Linehan | | 705/64 |
| 7,366,677 B1* | 4/2008 | Liu et al. | | 705/5 |
| 2003/0034873 A1* | 2/2003 | Chase et al. | | 340/5.2 |
| 2003/0061512 A1* | 3/2003 | Flurry et al. | | 713/201 |
| 2004/0078066 A1* | 4/2004 | Ohta et al. | | 607/60 |
| 2005/0109841 A1 | 5/2005 | Ryan et al. | | |
| 2005/0221878 A1 | 10/2005 | Van Bosch et al. | | |
| 2006/0136741 A1* | 6/2006 | Mercredi | | 713/185 |
| 2007/0118891 A1 | 5/2007 | Buer | | |
| 2007/0169182 A1* | 7/2007 | Wolfond et al. | | 726/7 |
| 2007/0180504 A1 | 8/2007 | Hung | | |
| 2007/0245148 A1* | 10/2007 | Buer | | 713/182 |
| 2008/0015748 A1* | 1/2008 | Nagy | | 701/33 |
| 2008/0163365 A1 | 7/2008 | Austin et al. | | |

(Continued)

FOREIGN PATENT DOCUMENTS

| | | |
|---|---|---|
| WO | 2008031143 A1 | 3/2008 |
| WO | 2008098710 A1 | 8/2008 |
| WO | 2009009788 A1 | 1/2009 |

OTHER PUBLICATIONS

"RSA Security Announces Roadmap for Strong Authentication", Retrieved at <<http://www.itweb.co.za/office/securedata/0502230913.htm, Feb. 23, 2005, pp. 3.

(Continued)

*Primary Examiner* — Michael Chao
(74) *Attorney, Agent, or Firm* — Henry Gabryjelski; Kate Drakos; Micky Minhas

(57) ABSTRACT

Systems and methods are provided for linking a web identity and a portable device to provide web access to a user from a vehicle. An example system includes a presence agent that may be configured to validate the presence of the portable device in the vehicle by recognizing a device identifier saved on the portable device. After the presence of the portable device is validated, a security manager may receive a user identifier, and verify if the user identifier corresponds with a known user value. Then, the security manager may send a user identity secure proxy to a credential manager. The credential manager may be configured to receive the user identity secure proxy, and in response, pass one or more credentials to a computing device onboard the vehicle. The credentials may indicate that the user is authorized to access one or more web services from the computing device.

17 Claims, 3 Drawing Sheets

(56) References Cited

U.S. PATENT DOCUMENTS

| | | |
|---|---|---|
| 2008/0168543 A1 | 7/2008 | von Krogh |
| 2008/0275990 A1* | 11/2008 | Prasad et al. ............ 709/225 |
| 2009/0199276 A1* | 8/2009 | Schneider ................ 726/5 |
| 2010/0199336 A1* | 8/2010 | Tan ........................ 726/6 |
| 2010/0325708 A1* | 12/2010 | Lundblade et al. ...... 726/6 |

OTHER PUBLICATIONS

Evers, Joris, "PayPal to Offer Password Key Fobs to Users", Retrieved at <<http://news.zdnet.com/2100-1009_22-150857.html, Jan. 12, 2007, pp. 4.

* cited by examiner

LINKING WEB IDENTITY AND ACCESS TO DEVICES

BACKGROUND

Cloud services are becoming increasingly available to users from vehicles, such as personal automobiles. The number, and the sophistication, of these services increase every day. The services can offer a rich set of features, and can store and provide, personal information. The presence of personal information, however, presents a variety of security concerns. The security concerns are often dealt with by requesting users to input authenticating information such as usernames and passwords. Current methods of providing usernames and passwords involve character input. However these methods are becoming increasingly inadequate, since repeated and complex character input can frustrate users. In addition, attempting to enter a complex username and/or password while driving may be particularly undesirable. Nonetheless, a driver may still desire to access various data for a variety of reasons.

SUMMARY

Systems and methods are provided for linking a web identity and a portable device to provide web access to a user from a vehicle. An example system includes a presence agent that may be configured to validate the presence of the portable device in the vehicle by recognizing a device identifier saved on the portable device. After the presence of the portable device is validated, a security manager may receive a user identifier, and verify if the user identifier corresponds with a known user value. Then, the security manager may send a user identity secure proxy to a credential manager. The credential manager may be configured to receive the user identity secure proxy, and in response, pass one or more credentials to a computing device onboard the vehicle. The credentials may indicate that the user is authorized to access one or more web services from the computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
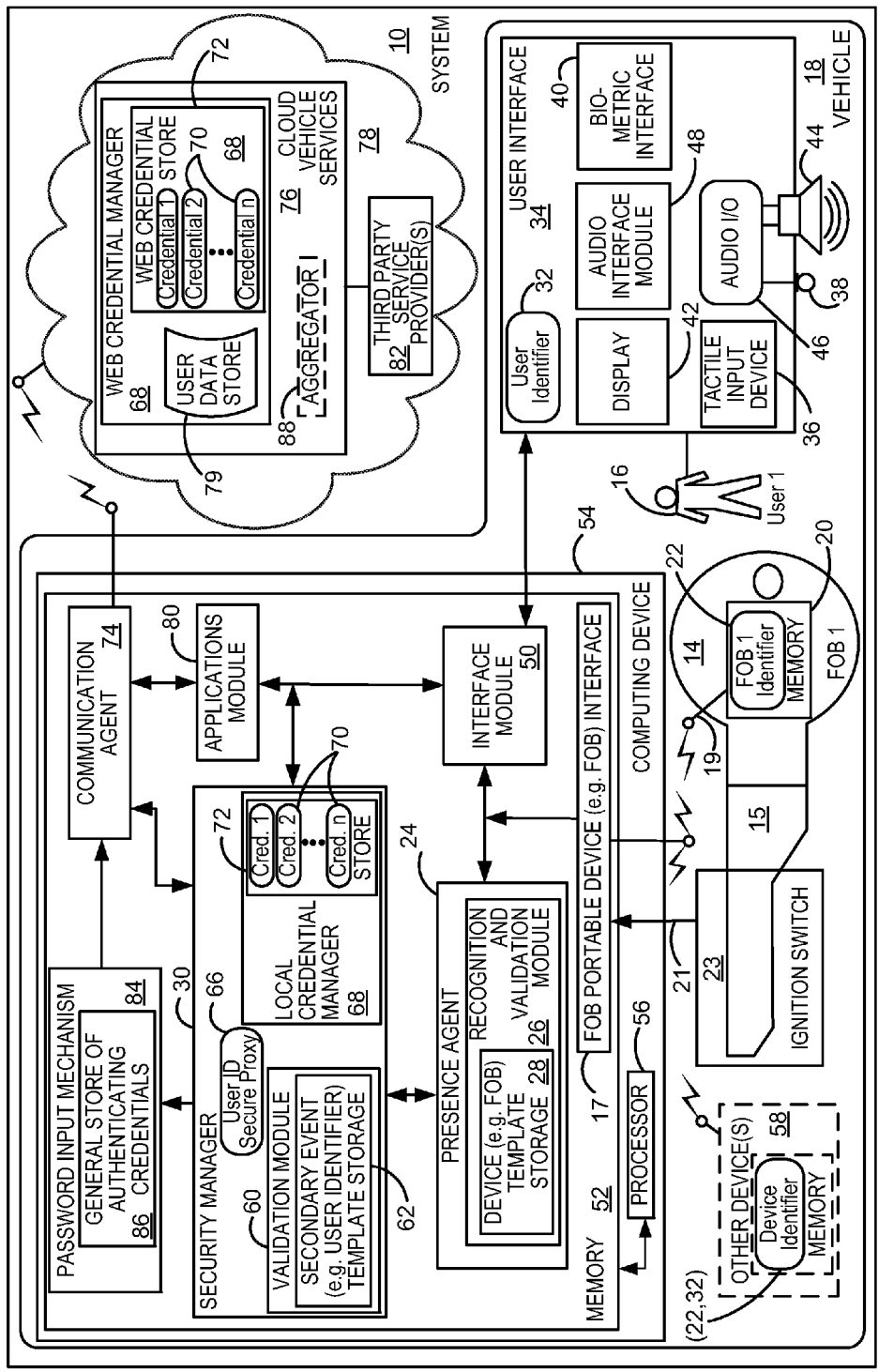
FIG. 1 is a schematic view illustrating a system for linking a web identity and a portable device to provide web access to a user from a vehicle.

FIG. 1 is a schematic diagram illustrating a system 10 for linking a web identity and a portable device 14 to provide web access to a user 16 from a vehicle 18. The system 10 may include a memory 20 resident on the portable device 14 configured to hold a device identifier 22. The system 10 may include a presence agent 24 configured to recognize and to validate the presence of the portable device 14 within the vehicle 18 by receiving the device identifier 22, and by comparing the device identifier 22 to a known device value. The recognition may be executed by a recognition and validation module 26, and the known device value may be saved in a device template storage 28 for comparison to the device identifier 22. In some examples, the device template storage 28 may be editable by, for example, adding additional device values, or by replacing existing device values with other device values.

The portable device 14 may be any user 16 accompanying device. In some examples the portable device 14 may be a key fob coupled with a key 15. The key 15 may be associated with and/or able to unlock and start the vehicle 18, and may be a wireless electronic key and/or a mechanical key for starting the vehicle. In many circumstances the primary driver of the vehicle 18 may be the exclusive user of a primary key fob. Accordingly, the key fob may signify the presence of that individual, i.e. the user 16, when onboard the vehicle. In some example embodiments a second, or a third key may also be associated with and/or able to unlock and start the vehicle 18. These keys may each include a fob that may each include corresponding identifiers. In other examples, there may be a valet key with a predetermined identity and predetermined access rights. In other examples, a single fob may store multiple identities in a single store in the fob, and then through various systems such those described herein various users may be identified. The fob may communicate with the presence agent 24 via a fob interface 17, through a wireless connection 19, or a wired connection 21. In some examples, the fob may communicate with the presence agent 24 wirelessly, or via the wired connection 21 when the key is in an ignition switch 23, either before, or after, the vehicle 18 is started.

In some examples, device identifier 22 may include a unique vehicle identifier such as the vehicle identification number (VIN). The device identifier 22 may be for example, a first number identifying the main driver of the vehicle, and a second number identifying a second driver. The second driver may be, for example, a spouse, or a partner of the first driver, who may live at the same address. Another driver identifier may identify a third driver. The third driver may be, for example, an occasional driver and reside at the same residence, or who may be a visitor borrowing the first driver's vehicle. Each of the first, second and/or third driver identifiers may enable access to different security levels, and therefore be granted access to different cloud services.

The system 10 may also include a security manager 30. The security manager 30 may be configured to receive the device identifier 22, and may be further configured to receive a user identifier 32. The user identifier 32 may be provided to the security manager 30 using various techniques. In some examples, the user identifier 32 may be a user supplied input. For example, the user supplied input may be one or more of a Personal Identification Number (PIN), and biometric data. The PIN may be inputted by the user 16 via a user interface 34 by using, for example, a tactile input device 36 such as a keyboard. The tactile input device may also be configured to receive various types of biometric data for example, without limitation, characteristics of the fingers, fingerprints, a hand print, or palm print of the user 16, through the use of finger print scanners, or other touch sensitive regions on the keyboard. Other types of devices for measuring biometric data may also be included, for example one or more biometric sensors, such as a scanner or camera. Such biometric sensors may be configured for iris scans, or facial recognition, or the like, and may be implemented by, for example, a biometric interface 40. The user interface 34 may also respond to a voice command as biometric input via, for example, a microphone 38. It will be appreciated that once the user identifier is received, it may be deemed to be valid for a predetermined period of time, to avoid unnecessary repeated input of the user identifier. Thus, the security manager may cache the user identifier for later retrieval and use within the predetermined period of time, and may rely upon the device identifier as the main mechanism for user authentication during this period of time. Further, where the user is prompted to enter a user identifier such as a PIN, but has forgotten it, security mechanisms may be provided to provide the user hints or security questions in order to obtain or reset the user identifier.

In some examples, the user interface 34 may be configured to prompt the user 16 to provide the user identifier 32 upon recognition of the portable device 14 by the presence agent 24. The prompting may be by way of an image on a display 42. The image may be an icon, or text, or a combination thereof. In some examples, the user interface 34 may prompt the user with an audio output via, for example, a speaker 44. The speaker 44 may be coupled with an audio input/output 46 via an audio interface module 48. The user interface 34 may be coupled with the security manager 30, and other elements of the system 10, via an interface module 50.

In some examples, the user identifier 32 may be provided by an additional portable device 58. The additional portable device 58 may be, for example any portable electronic device including, but not limited to a mobile phone, portable media player, or the like. It will be appreciated that the additional portable device 58 may contain the user identifier 32 stored in memory, or may prompt the user to enter the user identifier via a graphical user interface or biometric interface, for example. Further, as another example, the portable device 14 and/or additional portable device 58 may use a plug-in fob, such as a USB fob containing the user identifier 32.

In some examples, the presence agent 24, and the security manager 30 may be included in a memory 52 resident in a computing device 54. The computing device 54 may be onboard the vehicle 18. Various other components, such as those illustrated in FIG. 1, and in some example embodiments, other components not illustrated herein, may also be included in the memory 52 and/or the computing device 54. The computing device 54 may include a processor 56 coupled with the memory 52. The memory 52 may be configured to hold various computer, or processor-executable instructions. The processor 56 may take the form of a central processing unit (CPU), or other suitable controller for executing the instructions.

Returning again to the discussion of the security manager 30, the security manager 30 may also be configured to verify if the user identifier 32 corresponds with a known user value. This may be done by a validation module 60 by comparing the user value 32 to known user values in a user identifier store 62. Upon receipt of the device identifier 32, and upon verifying the user identifier 32, the security manager 30 may be configured to send an identity confirmation message, such as, for example, a user identity secure proxy 66 to a credential manager 68. The credential manager 68 may hold one or more credentials 70 in a credential store 72.

In some examples, the credential manager 68 and/or the credential store 72 may be executed by the onboard computing device 54. The credential manager 68, and/or the credential store 72, may, or may not, be included as part of the security manager 30. In other examples, the credential manager 68, and/or the credential store 72, may be executed on a remote server in communication with the onboard computing device 54 via, for example, a communication agent 74. The communication agent may be configured to establish a connection between the vehicle and the one or more web services. The remote server may be operated by one or more cloud vehicle services 76. The cloud vehicle services 76 may be part of a data network 78, for example the Internet.

The credential manager 68 may be configured to receive the user identity secure proxy 66 from the security manager 30, and to pass the one or more credentials 70 to the computing device 54 onboard the vehicle 18. The one or more credentials 70 may indicate that the user 16 is authorized to access one or more web services from the computing device 54 onboard the vehicle 18. In some examples, the one or more user credentials 70 may enable a single aggregator sign-on service to provide access to multiple web services. The credential manager 68, whether onboard the vehicle, or included in the cloud vehicle services 76 may include a user data store 79.

The onboard computing device 54 may also include an applications module 80. The applications module 80 may be configured to run, and/or enable execution of various applications by the computing device 54 from the vehicle 18. The applications may be, for example, web applications executable when the user 16 is authorized to access one or more web services. In some cases, the one or more web services may be provided by a third party service provider 82. The one or more credentials 70 may be provided to the third party service provider 82, by the computing device 54 after the one or more credentials 70 are made available to the onboard computing device 54 by the credential manager 68.

In some examples, the system 10 may be configured to manage various levels of security, and/or to provide various credentials to various applications and/or services when requested. For example, a remote server, such as a web based service may prompt for additional credentials, such as a username, and/or password in order to grant the user 16 access to a higher level of service than initially granted. For example, initially the user 16 may be given access to a news service, or a calendaring application, or the like. However, if the user 16 would like access to, for example, personal banking information, additional credentials may be requested. Accordingly, various examples may include a password input mechanism 84. The password input mechanism 84 may have a store of authenticating credentials 86 and may be onboard the vehicle and/or in the cloud vehicle services 76. The password input mechanism 84 may be configured to receive the one or more credentials 70, and be further configured to supply a predetermined authentication failure message to a specified web service when the one or more credentials 70 are insufficient to gain access to the specified web service. As an alternative to, or in addition to, the password input mechanism 84, the cloud vehicle service 76, and/or the computing device 54, may include a content aggregator 88 that may be configured to provide additional credentials to various distributed or federated web services hosted on other servers, when appropriate to gather content from these servers.

Now, another aspect of the invention will be described, continuing to refer to FIG. 1. It will be appreciated that system 10 may be referred to as a web services access control system 10 for use in the vehicle 18. The web services access control system 10 may be described to include a presence agent 24 configured to verify a presence of a portable device 14 when the portable device 14 is onboard the vehicle 18. A security manager 30 may be configured to authenticate an identity of a user 16 by receiving a user supplied input, e.g. a user identifier 32, and by comparing the user supplied input to a known value. A credential manager 68 may be operatively coupled with the security manager 30, and may be configured to receive a user identity secure proxy 66 upon verification of the presence of the portable device 14 onboard the vehicle 18, and upon receipt of the user supplied input. The credential manager 68 may be further configured to pass one or more credentials 70 to the vehicle 18 upon receiving the user identity secure proxy 66. The one or more credentials 70 may enable access to one or more web services from the vehicle 18.

Figure 2:
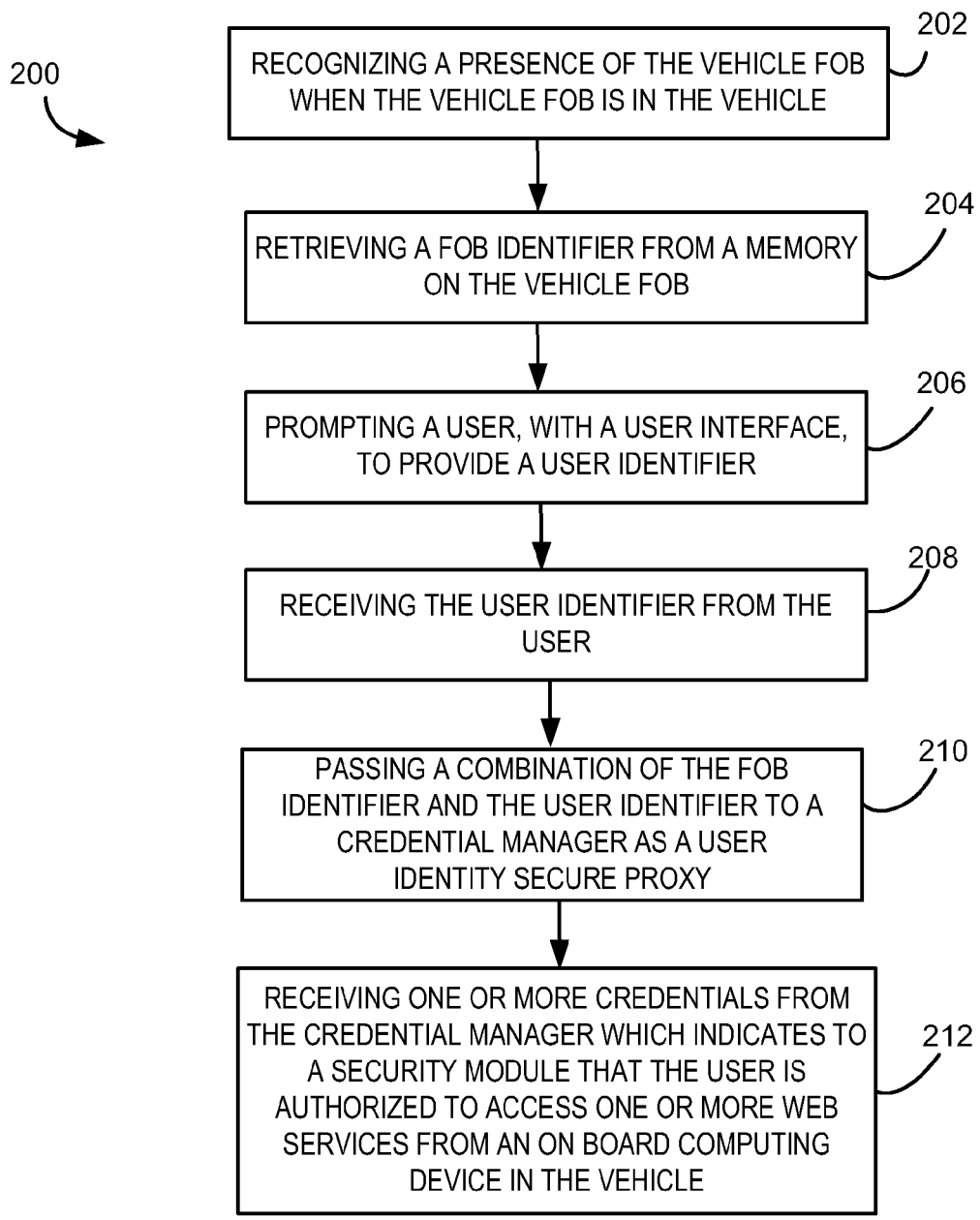
FIG. 2 and FIG. 3 are flowcharts illustrating example embodiments of a method for linking a web identity and web access to portable device.

FIG. 2 is a flowchart illustrating an embodiment of a method 200 for linking a web identity and web access to a remote vehicle fob, which may be associated with a vehicle. For example the fob may be attached to a key that may be configured to unlock and/or start the vehicle. Method 200 may be implemented using the systems and devices described above, or using other suitable hardware. The method 200 may include, at 202, recognizing a presence of the vehicle fob when the vehicle fob is in the vehicle. The method 200 may include, at 204, retrieving a fob identifier from a memory on the vehicle fob. The method 200 may also include, at 206, prompting a user, with a user interface, to provide a user identifier. The method 200 may also include, at 208, receiving the user identifier from the user. The method 200 may also include, at 210, passing a combination of the fob identifier and the user identifier to a credential manager as a user identity secure proxy. In addition, the method 200 may also include, at 212, receiving one or more user credentials from the credential manager, which may indicate to a security manager that the user is authorized to access one or more web services from an onboard computing device in the vehicle.

Figure 3:
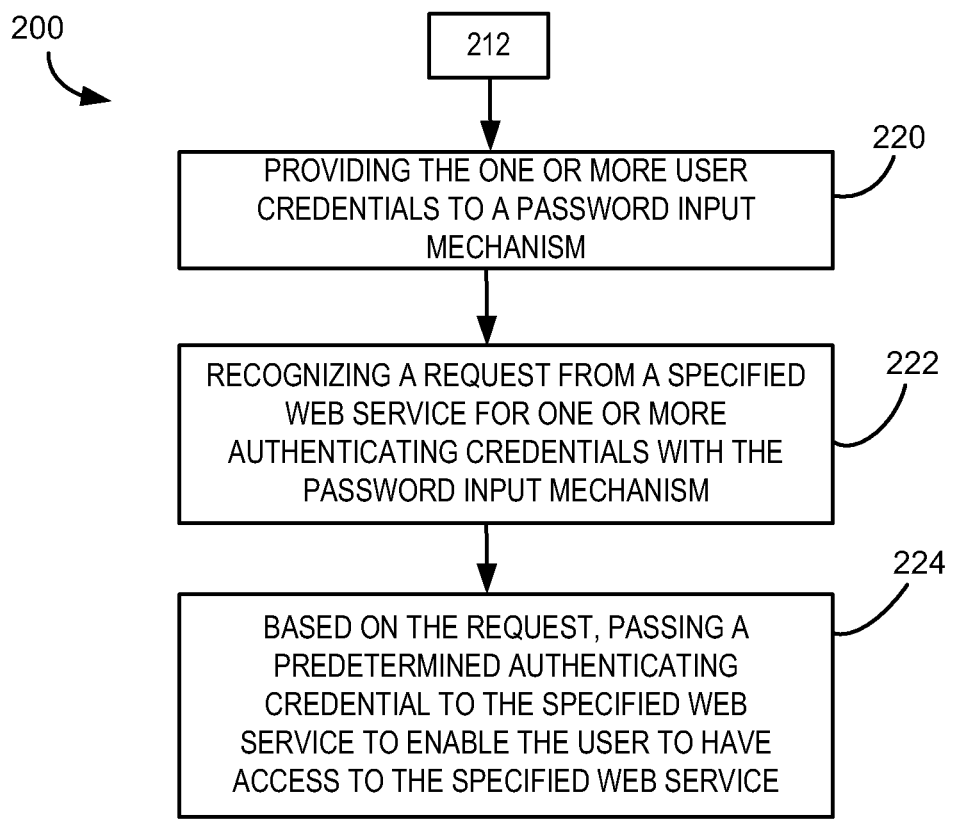

FIG. 3 is a flowchart illustrating a modification of the method 200 illustrated in FIG. 3. The method 200 may be conducted as an addition to the operations illustrated in FIG. 2, and may include, at 220 providing the one or more user credentials to a password input mechanism. The method 200 may also include, at 222, recognizing a request from a specified web service for one or more authenticating credentials with the password input mechanism. The method 200 may also include, at 224, based on the request, passing a predetermined authenticating credential to the specified web service to enable the user to have access to the specified web service. In some examples, the password input mechanism may be served by a program executed on a remote server. In other examples, the password input mechanism may be executed by the onboard computing device.

The above-described systems and methods may be utilized by one or more users of a vehicle to access web services that verify user authentication from an onboard computing device, in an efficient and convenient manner, potentially avoiding the drawbacks of overly complicated or repeated data input by the user associated with prior systems. The utility of these systems and methods is further described in the following example use scenario.

Example Use Scenario

Tim recently bought a new car, when he purchased the car the salesperson introduced him to a website configured in accordance with various example embodiments of the present disclosure, which will be referred to here under the pseudonym www.examplewebsite.com. The website may enable Tim to, for example, track vehicle maintenance, get vehicle diagnostics data, get bulletins, and make personal settings for the car. As part of the process Tim may sign into the site, and add his car's serial number. Then, Tim may associate himself with the Driver 1 remote fob, and may associate his wife with Driver 2. Alternatively, Tim could grant limited access rights to the dealer to perform these tasks on his behalf. The site may enable Tim to set personal configurations, such as, news preferences, navigation settings, driving styles, subscribed web services, etc.

When Tim got home he read up on how to configure some of the web services that were included in the car, and he decided to configure them. Dreading entering all the passwords in via the navigation control in the car, he remembered that the salesperson said he could do it all online from his PC. After dinner, he signed into www.examplewebsite.com and began to configure his services. Tim was quickly able to associate services in the car to different accounts he had, for example, LiveID for WINDOWS® LIVE services, his corporate user name for email, and his password, etc. When Tim was done, he clicked "save" and was prompted to provide a 4-Digit PIN that would be used in association with his remote car fob to access these credentials.

The next morning Tim got into his car and upon starting the engine was prompted by the user interface that "new services were configured for access, please enter your PIN to begin access these services" after entering his PIN, the car began to access the services for Tim automatically.

Later that week, Tim and his wife went out to dinner at a restaurant with valet parking to celebrate the new car. Tim did not want the valet to have access to his work calendar and address book, so using voice commands he placed the car into valet mode. In valet mode, if any service that requires confirmation of user credentials is accessed, the system will not rely upon the detected presence of the car fob for authentication, but instead will prompt the driver for a PIN. Once Tim got back into the car he entered the PIN, unlocking the credential usage.

A few days later, Tim's wife drove Tim's new car. As Driver 2 she had not configured any of the web service settings that Tim had. Various embodiments may still enable her to have access to basic services like weather, movie times, gas prices and local search that do not prompt for user credentials. Tim's wife decides she wants to check her own calendar for Monday so that she schedule a lunch with Tim. When she navigates to Calendar she is prompted to configure the service locally or asked to visit www.examplewebsite.com to configure the service for Driver 2.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, enhanced mobile telephone device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A system for linking a web identity and a portable device to provide web access to a user from a vehicle, the system comprising:
   a memory resident on the portable device configured to hold a device identifier; and
   an onboard computing device having a processor and associated onboard memory, the processor being configured to execute processor-executable instructions stored in the onboard memory comprising:
      a presence agent configured to recognize and to validate the presence of the portable device within the vehicle by receiving the device identifier and comparing the device identifier to a known device value;
      a security manager configured to receive the device identifier, and further configured to receive a user identifier, the security manager configured to verify if the user identifier corresponds with a known user value, upon receipt of the device identifier, and upon verifying the user identifier, the security manager configured to send a user identity secure proxy to a credential manager;
      the credential manager configured to receive the user identity secure proxy from the security manager, to pass one or more credentials to a computing device onboard the vehicle, the one or more credentials indicating that the user is authorized to access a first group of a plurality of web services from the computing device onboard the vehicle, and to grant the user access to the first group of a plurality of web services from the onboard vehicle computing device;
      a password input mechanism configured to pre-store authenticating credentials for the user, for accessing remote web services having a higher level of security than the first group of web services, in a credential store associated with the password input mechanism, the authenticating credentials for the higher level of security comprising one or more credentials in addition to the one or more credentials authorizing the user to access the first group of web services, for authorizing the user to access a higher level of service than the first group of web services; and
      a communication agent configured to send a request to access a specified web service having the higher level of security than the first group of web services;
      wherein the password input mechanism is configured to receive the request from the specified web service for the one or more of the authenticating credentials pre-stored at the password input mechanism in addition to the one or more credentials authorizing the user to access the first group of web services, via the communication agent, and based on the request, to pass a predetermined authenticating credential for the specified web service for processing by a web credential manager of the specified web service to enable the user to have access to the specified web service.

2. The system of claim 1, wherein the portable device is a key fob.

3. The system of claim 2, wherein the user identifier is a user supplied input.

4. The system of claim 3, wherein the user supplied input is one or more of a Personal Identification Number (PIN) and biometric data.

5. The system of claim 1, further comprising a user interface configured to prompt the user to provide the user identifier upon recognition of the portable device by the presence agent.

6. The system of claim 1, wherein the user identifier is provided by an additional portable device.

7. The system of claim 6, wherein one or more of the portable device and the additional portable device is a mobile phone.

8. The system of claim 1, wherein the communication agent is coupled with the security manager and resident on the vehicle, the communication agent configured to establish a connection between the vehicle and the one or more web services.

9. The system of claim 1, wherein the password input mechanism is further configured to supply an authentication failure message to a specified web service of the first group of web services when the one or more credentials to access the specified web service of the first group of web services are insufficient to gain access to the specified web service.

10. A method for linking a web identity and web access to a remote vehicle fob, the remote vehicle fob associated with a vehicle, the method comprising, at an onboard vehicle computing device:
    recognizing a presence of the vehicle fob when the vehicle fob is in the vehicle;
    retrieving a fob identifier from a memory on the vehicle fob;
    prompting a user, with a user interface, to provide a user identifier;
    receiving the user identifier from the user;
    passing a combination of the fob identifier and the user identifier to a local credential manager as a user identity secure proxy; and
    receiving one or more user credentials from the local credential manager which indicates to a security module that the user is authorized to access a first group of a plurality of web services from the onboard vehicle computing device in the vehicle;
    granting the user access to the first group of web services from the onboard vehicle computing device;
    pre-storing authenticating credentials for the user for accessing remote web services having a higher level of security than the first group of web services, in a credential store associated with a password input mechanism, the authenticating credentials for the higher level of security comprising one or more credentials in addition to the one or more credentials authorizing the user to access the first group of web services, for authorizing the user to access a higher level of service than the first group of web services;
    sending a request to access a specified web service having the higher level of security than the first group of web services;
    receiving the request from the specified web service for one or more of the authenticating credentials pre-stored at the password input mechanism, in addition to the one or more credentials authorizing the user to access the first group of web services, via a communication agent; and
    based on the request, passing a predetermined authenticating credential for the specified web service for processing by a web credential manager of the specified web service to enable the user to have access to the specified web service.

11. The method of claim 10, wherein the user identifier is a Personal Identification Number (PIN).

12. The method of claim 10, wherein the user identifier is biometric data of the user received by the user interface.

13. The method of claim 10, wherein the web credential manager is executed on a remote server in communication with the onboard vehicle computing device.

14. The method of claim 10, wherein the local credential manager is executed by the onboard vehicle computing device.

15. The method of claim 10, wherein the one or more user credentials to access the first group web services enables an aggregator sign-on service to provide access to multiple web services of the first group of web services.

16. The method of claim 10, wherein the password input mechanism is served by a program executed on a remote server.

17. The method of claim 10, wherein the password input mechanism is executed by the onboard vehicle computing device.

* * * * *